(12) United States Patent  (10) Patent No.: US 8,560,688 B2
Mescher et al.  (45) Date of Patent: *Oct. 15, 2013

(54) MONITORING SENSORS FOR SYSTEMS MANAGEMENT

(75) Inventors: Tonya D. Mescher, Raleigh, NC (US); Christopher T. Schnorr, New Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/517,681

(22) Filed: Jun. 14, 2012

(65) Prior Publication Data
US 2012/0254423 A1 Oct. 4, 2012

Related U.S. Application Data

(63) Continuation of application No. 12/966,590, filed on Dec. 13, 2010.

(51) Int. Cl.
*G06F 15/173* (2006.01)
(52) U.S. Cl.
USPC ........................................................ 709/224
(58) Field of Classification Search
None
See application file for complete search history.

(56) References Cited

U.S. PATENT DOCUMENTS

| | | | |
|---|---|---|---|
| 6,904,391 B2 | 6/2005 | Merkin et al. | |
| 2004/0228063 A1* | 11/2004 | Hawkins et al. | 361/115 |
| 2004/0254767 A1* | 12/2004 | Merkin et al. | 702/188 |
| 2006/0158325 A1 | 7/2006 | Cha et al. | |
| 2007/0168049 A1 | 7/2007 | Rao et al. | |
| 2008/0005748 A1 | 1/2008 | Mathew et al. | |
| 2009/0089624 A1* | 4/2009 | Austen et al. | 714/39 |
| 2009/0119065 A1 | 5/2009 | Grichnik et al. | |

* cited by examiner

*Primary Examiner* — Peling Shaw
(74) *Attorney, Agent, or Firm* — Thomas E. Tyson; Brandon C. Kennedy; Biggers & Ohanian, LLP

(57) ABSTRACT

Methods, apparatuses, and computer program products are provided for monitoring sensors for systems management. Embodiments include establishing, by a server, an entity identification for a component of the server; establishing, by the server, for a plurality of sensors a single virtual sensor number; establishing, by the server, for each sensor having the single virtual sensor number a unique instance identification representing the sensor; receiving, from a system management node, by the server, a request for a sensor reading, the request including the entity identification, the single virtual sensor number, and the unique instance identification; based on the entity identification, the single virtual sensor number, and the unique instance identification, retrieving, by the server, a sensor reading; and transmitting to the system management node, by the server, the sensor reading.

7 Claims, 5 Drawing Sheets

MONITORING SENSORS FOR SYSTEMS MANAGEMENT

CROSS-REFERENCE TO RELATED APPLICATION

This application is a continuation application of and claims priority from U.S. patent application Ser. No. 12/966,590, filed on Dec. 13, 2010.

BACKGROUND OF THE INVENTION

1. Field of the Invention

The field of the invention is data processing, or, more specifically, methods, apparatus, and products for monitoring sensors for systems management.

2. Description of Related Art

System management nodes often use sensors to measure performance of components of a server. If a sensor determines that the performance of a particular component being measured falls below a threshold, the system management node is notified. However, as the complexity of a server increases, the number of sensors needed by the system management node to monitor the server increases.

SUMMARY OF THE INVENTION

Methods, apparatuses, and computer program products are provided for monitoring sensors for systems management. Embodiments include establishing, by a server, an entity identification for a component of the server; establishing, by the server, for a plurality of sensors a single virtual sensor number; establishing, by the server, for each sensor having the single virtual sensor number a unique instance identification representing the sensor; receiving, from a system management node, by the server, a request for a sensor reading, the request including the entity identification, the single virtual sensor number, and the unique instance identification; based on the entity identification, the single virtual sensor number, and the unique instance identification, retrieving, by the server, a sensor reading; and transmitting to the system management node, by the server, the sensor reading.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
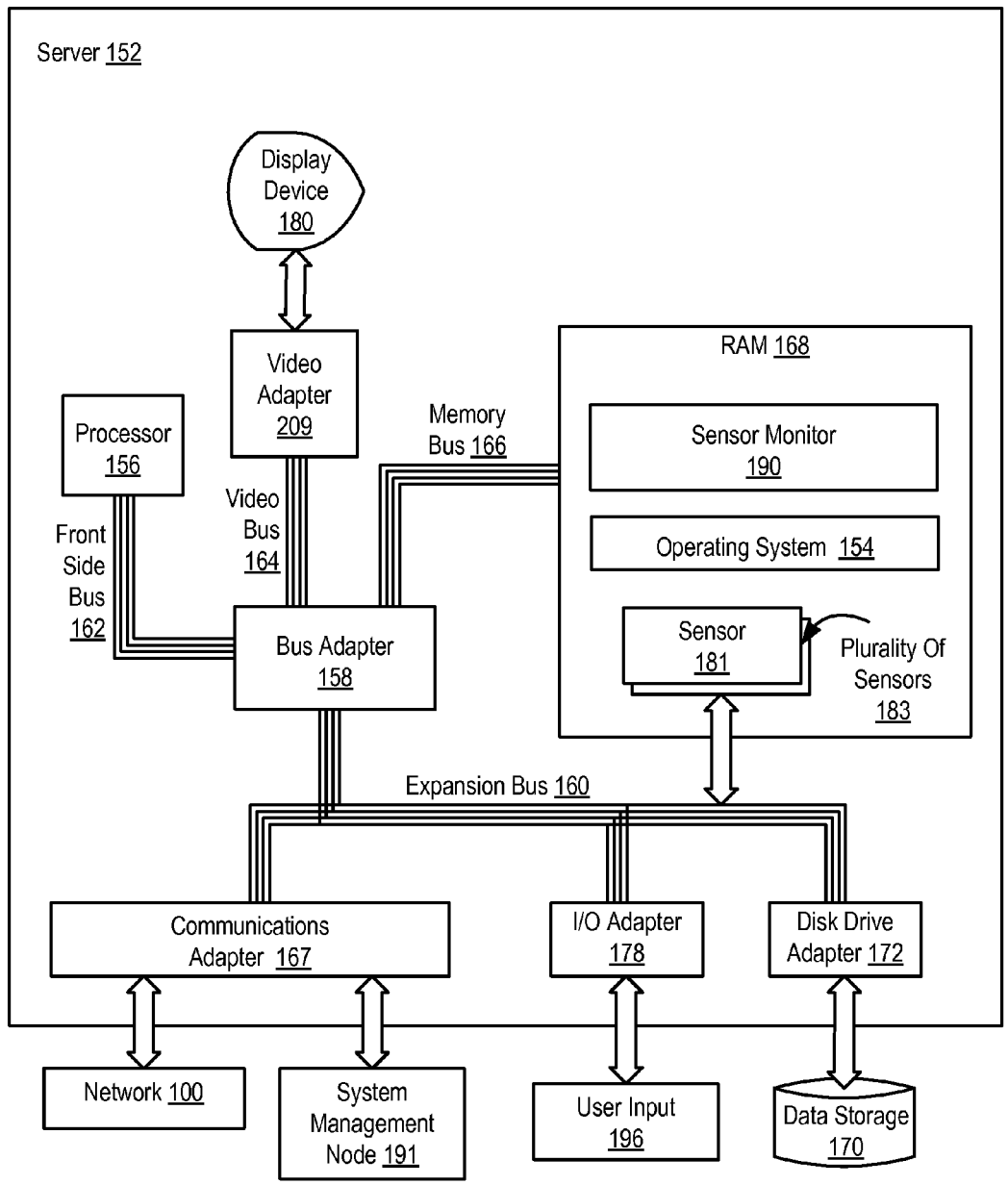
FIG. 1 sets forth a block diagram of automated computing machinery comprising an example server useful in monitoring sensors for systems management according to embodiments of the present invention.

FIG. 1 sets forth a block diagram of automated computing machinery comprising an example server (152) useful in monitoring sensors for systems management according to embodiments of the present invention. The server (152) of FIG. 1 includes at least one computer processor (156) or 'CPU' as well as random access memory (168) ('RAM') which is connected through a high speed memory bus (166) and bus adapter (158) to processor (156) and to other components of the server (152). The server (152) includes a plurality (183) of sensors for monitoring one or more components of the server (152) to measure parameters associated with a portion of RAM (168). A sensor (181) is an electrical device that measures performance parameters such as temperature, fan speed, voltage, and so on.

Stored in RAM (168) is a sensor monitor (190) for monitoring the plurality (183) of sensors in the server (152). The sensor monitor (190) of FIG. 1 may communicate with a system management node (191) that manages the server (152). The sensor monitor (190) and the system management node (191) may communicate via a common interface, such as by the Intelligent Platform Management Interface (IPMI). Intelligent Platform Management Interface (IPMI) specification is a standard that defines a set of common interfaces to a computer system that system administrators can use to monitor system health and manage the system. IPMI, as part of its architecture, defines sensor data records (SDR) and how to implement the plurality (183) of sensors to monitor for events defined in the SDRs. Common interfaces, such as IMPI may specify a maximum number of sensors, such as two hundred and fifty-five, that may be defined in a particular SDR. The system management node (191) and the sensor monitor (190) of FIG. 1 may be configured to create more than two-hundred and fifty-five virtual sensors that function like the plurality (183) of physical sensors, thus enabling the system management node (191) to monitor the server (152) with more sensor input.

The sensor monitor (190) includes computer program instructions that when executed by the computer processor (156) cause the computer processor (156) to establish, by the server (152), an entity identification for a component of the server (152); establish, by the server (152), for a plurality (183) of sensors a single virtual sensor number; establish, by the server (152), for each sensor having the single virtual sensor number a unique instance identification representing the sensor; receive, from a system management node (191), by the server (152), a request for a sensor reading, the request including the entity identification, the single virtual sensor number, and the unique instance identification; based on the entity identification, the single virtual sensor number, and the unique instance identification, retrieve, by the server (152), a sensor reading; and transmit to the system management node (191), by the server (152), the sensor reading.

IPMI implements what is often called a "side-band" management LAN connection. This connection utilizes a System Management Bus (SMBUS) interface between a BMC (Baseboard Management Controller) and a board Network Interface Controller (NIC). This solution has the advantage of reduced costs but also provides limited bandwidth—sufficient for text console redirection but not for video redirection. In other words, when a remote server, such as the server (152), is down a system administrator can access it through IPMI, via the system management node (191) and utilize a text console (not shown). This will be sufficient for a few vital functions, such as checking the event log, accessing the BIOS setup and perform power on, power off or power cycle. However, more advanced functions, such as remote re-installation of an operating system, may require an Out-of-band management approach utilizing a dedicated LAN Connection.

The system management node (191) of FIG. 1 may be an IPMI sub-system that consists of a main controller called a baseboard management controller (BMC) and other management controllers distributed among different system modules that are referred to as "satellite" controllers. The satellite controllers within the same chassis connect to the BMC via the system interface called IPMB (Intelligent Platform Management Bus/Bridge)—an enhanced implementation of I²C (Inter-Integrated Circuit). The BMC connects to satellite controllers or another BMC in another chassis via IPMC (Intelligent Platform Management Chassis) bus/bridge. It may be managed with the Remote Management Control Protocol (RMCP).

Also stored in RAM (168) is an operating system (154). Operating systems useful monitoring sensors for systems management according to embodiments of the present invention include UNIX™, Linux™, Microsoft XP™, AIX™ IBM's i5/OS™ and others as will occur to those of skill in the art. The operating system (154) and the sensor monitor (190) in the example of FIG. 1 are shown in RAM (168), but many components of such software typically are stored in non-volatile memory also, such as, for example, on a disk drive (170).

The server (152) of FIG. 1 includes disk drive adapter (172) coupled through expansion bus (160) and bus adapter (158) to processor (156) and other components of the server (152). Disk drive adapter (172) connects non-volatile data storage to the server (152) in the form of disk drive (170). Disk drive adapters useful in computers for monitoring sensors for systems management according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (196) such as keyboards and mice. The example server (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example server (152) of FIG. 1 includes a communications adapter (167) for data communications with the system management node (191) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for monitoring sensors for systems management according to embodiments of the present invention include modems for wired dial-up communications, Ethernet (IEEE 802.3) adapters for wired data communications network communications, and 802.11 adapters for wireless data communications network communications.

Figure 2:
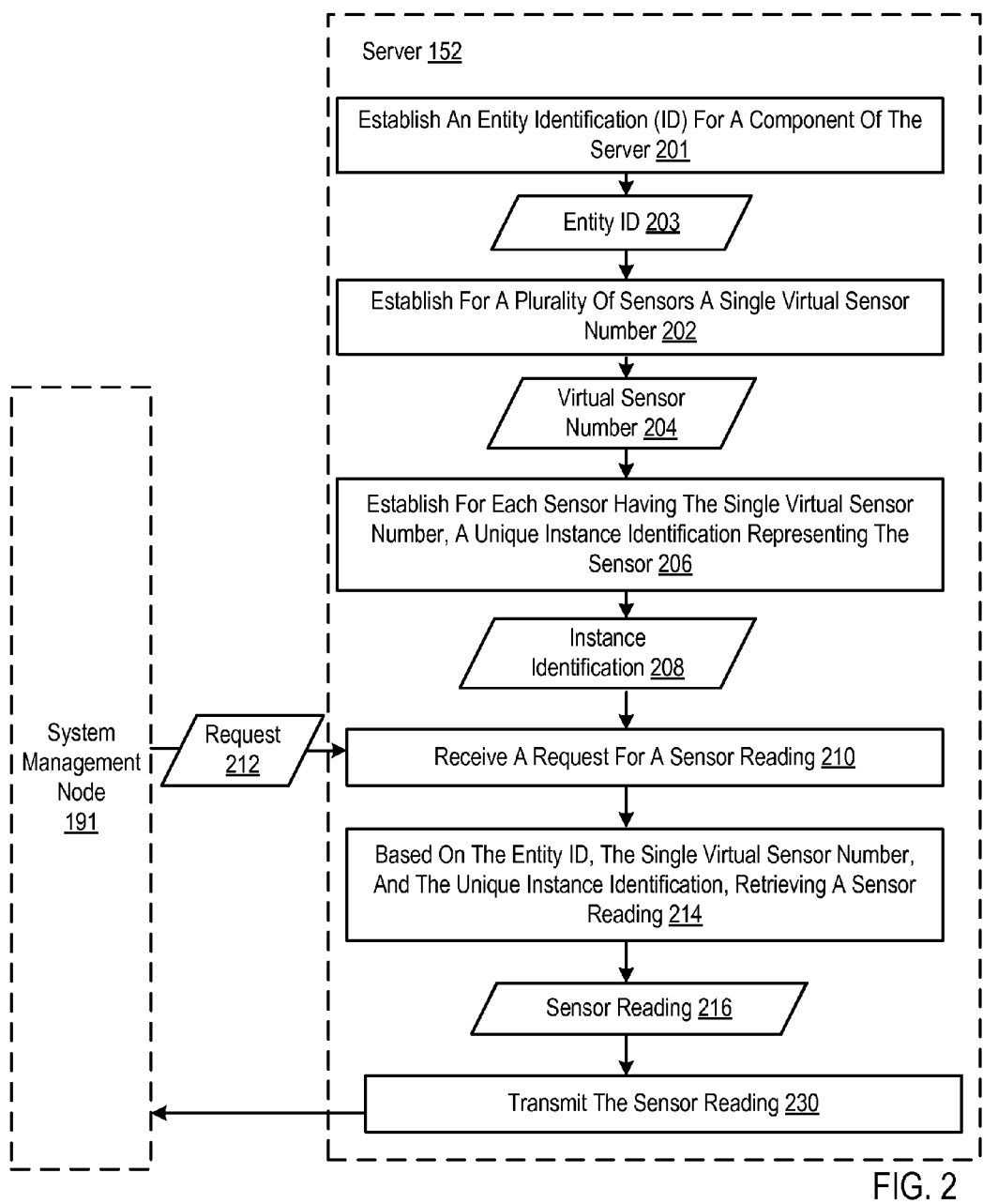
FIG. 2 sets forth a flow chart illustrating an example of a method for monitoring sensors for systems management according to embodiments of the present invention.

For further explanation, FIG. 2 sets forth a flow chart illustrating an example of a method for monitoring sensors for systems management according to embodiments of the present invention. The method of FIG. 2 includes establishing (201), by the server (152), an entity identification (ID) (203) for a component of the server (152). Establishing (201) the entity identification (ID) (203) for a component of the server (152) may be carried out by assigning entity IDs to each of the components of the server (152) that are monitored by one or more of the plurality (183) of sensors and storing the assignments in the sensor monitor (190) of FIG. 1.

The method of FIG. 2 also includes establishing (202), by a server (152), for a plurality (183) of sensors a single virtual sensor number (204). Establishing (202) for a plurality (183) of sensors a single virtual sensor number (204) may be carried out by modifying a parameter of a sensor data record to associate each sensor in the plurality of sensors with the single virtual sensor number (204).

The method of FIG. 2 includes establishing (206), by the server (152), for each sensor (181) having the single virtual sensor number (204) a unique instance identification (208) representing the sensor (181). Establishing (206) for each sensor (181) having the single virtual sensor number (204) a unique instance identification (208) representing the sensor (181) may be carried out by identifying each sensor that that is associated with the single virtual sensor number (204) and modifying a parameter of a sensor data record to associate each identified sensor with a specific instance identification (208).

The method of FIG. 2 includes receiving (210), from the system management node (191), by the server (152), a request (212) for a sensor reading, the request (212) including the entity identification (203), the single virtual sensor number (204), and the unique instance identification (208). Receiving (210), from the system management node (191) a request (212) for a sensor reading may be carried out by establishing communication between the server (152) and the system management node (191) and receiving data that indicates the system management node (191) wants a sensor reading of one or more components of the server (152).

The method of FIG. 2 also includes based on the entity identification (203), the single virtual sensor number (204), and the unique instance identification (208), retrieving (214), by the server (152), a sensor reading (216). Retrieving (214) the sensor reading (216) may be carried out by receiving from a sensor data record the unique instance identification (208) and using the unique instance identification (208) to query for the sensor reading (216) associated with the unique instance identification (208).

The method of FIG. 2 also includes transmitting (230) to the system management node (191), by the server (152), the sensor reading (216). Transmitting (230) to the system management node (191) the sensor reading (216) may be carried out by establishing communication between the system management node (191) and the server (152) and transmitting data indicating the sensor reading (216).

Figure 3:
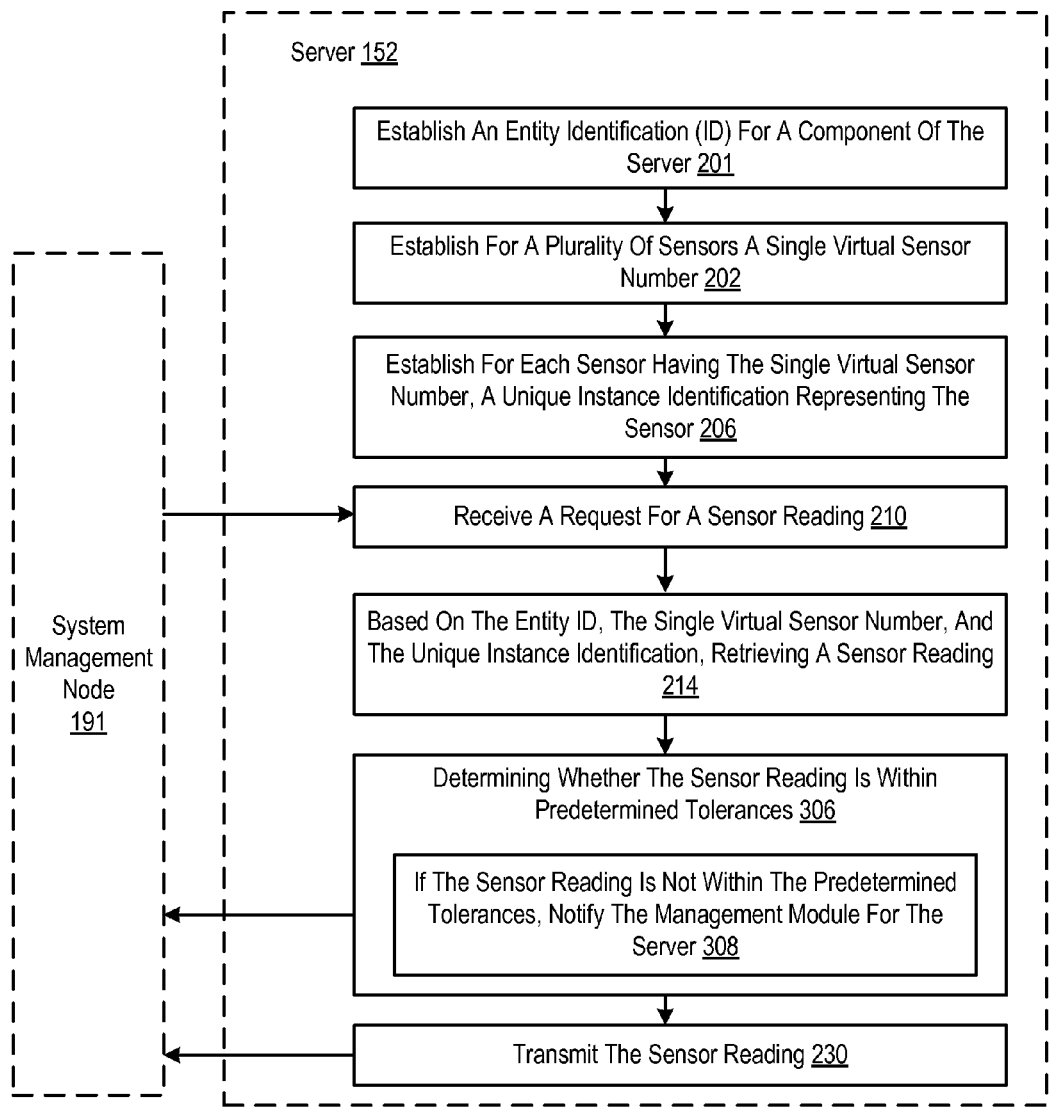
FIG. 3 sets forth a flow chart illustrating another example of a method for monitoring sensors for systems management according to embodiments of the present invention.

For further explanation, FIG. 3 sets forth a flow chart illustrating another example of a method for monitoring sensors for systems management according to embodiments of the present invention. The method of FIG. 3 includes the following elements of the method of FIG. 2: establishing (201), by the server (152), an entity identification (ID) (203) for a component of the server (152); establishing (202), by a server (152), for a plurality (183) of sensors a single virtual sensor number (204); establishing (206), by the server (152), for each sensor (181) having the single virtual sensor number (204) a unique instance identification (208) representing the sensor (181); receiving (210), from the system management node (191), by the server (152), a request (212) for a sensor reading, the request (212) including the entity identification (203), the single virtual sensor number (204), and the unique instance identification (208); based on the entity identification (203), the single virtual sensor number (204), and the unique instance identification (208), retrieving (214), by the server (152), a sensor reading (216); and transmitting (230) to the system management node (191), by the server (152), the sensor reading (216).

The elements of FIG. 3 that differ from the method of FIG. 2 include: determining (306) whether the sensor reading (216) is within predetermined tolerances; and if the sensor reading (216) is not within the predetermined tolerances, notifying (308) a system management node (191) for the server (152).

The method of FIG. 3 also includes determining (306) whether the sensor reading (216) is within predetermined tolerances. Determining (306) whether the sensor reading (216) is within the predetermined tolerances may be carried out by comparing a value of the sensor reading (216) with a value or range of values defined by a predetermined tolerance and determining if the value of the sensor reading (216) is outside of the range of values defined by the predetermined tolerance.

The method of FIG. 3 includes if the sensor reading (216) is not within the predetermined tolerances, notifying (308) a system management node (191) for the server (152). Notifying (308) the system management node (191) for the server (152) may be carried out by determining that a value of the sensor reading (216) is outside the range of values defined by the predetermined tolerances and transmitting a message to the system management node (191) indicating that the value of the sensor reading (216) is outside the range of values defined by the predetermined tolerances.

Figure 4:
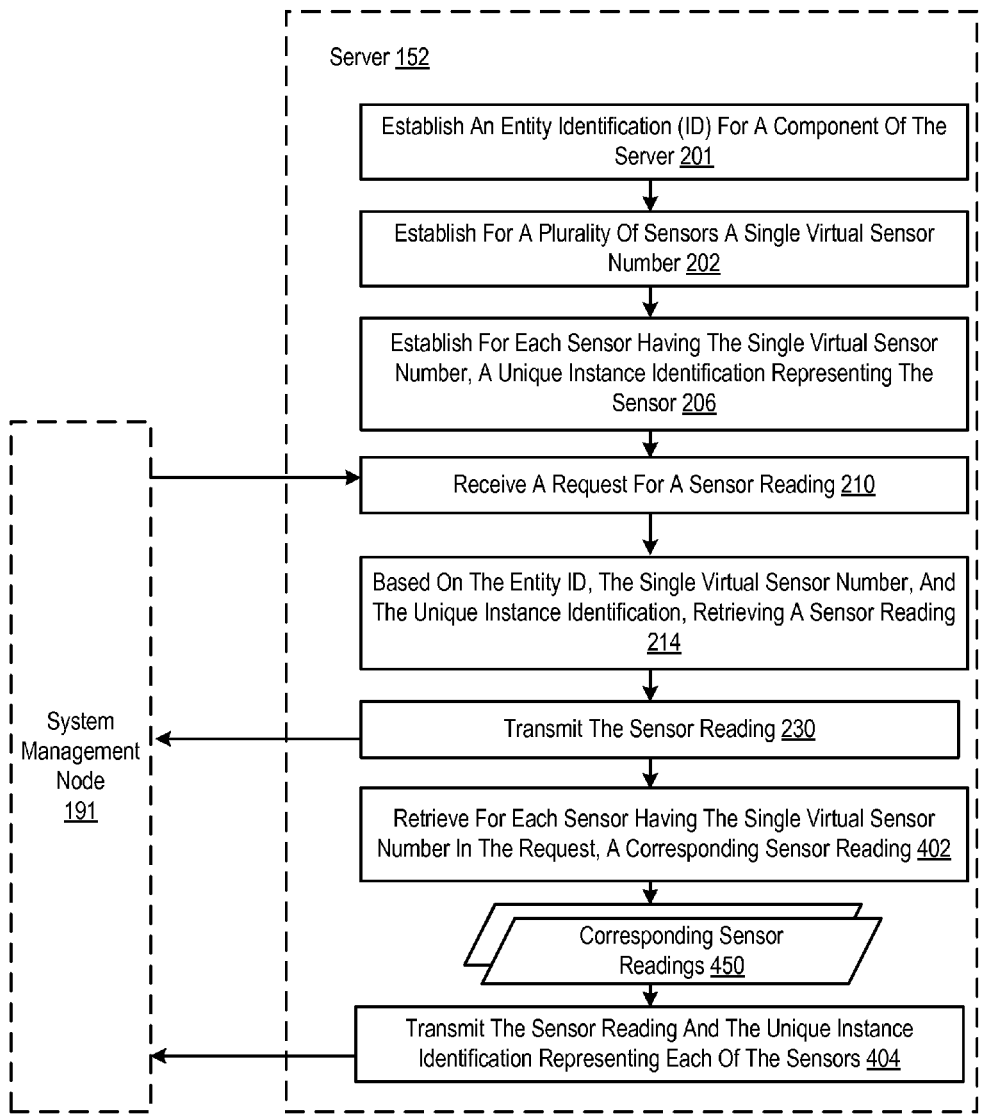
FIG. 4 sets forth a flow chart illustrating another example of a method for monitoring sensors for systems management according to embodiments of the present invention.

For further explanation, FIG. 4 sets forth a flow chart illustrating another example of a method for monitoring sensors for systems management according to embodiments of the present invention. The method of FIG. 4 includes the following elements of the method of FIG. 2: establishing (201), by the server (152), an entity identification (ID) (203) for a component of the server (152); establishing (202), by a server (152), for a plurality (183) of sensors a single virtual sensor number (204); establishing (206), by the server (152), for each sensor (181) having the single virtual sensor number (204) a unique instance identification (208) representing the sensor (181); receiving (210), from the system management node (191), by the server (152), a request (212) for a sensor reading, the request (212) including the entity identification (203), the single virtual sensor number (204), and the unique instance identification (208); based on the entity identification (203), the single virtual sensor number (204), and the unique instance identification (208), retrieving (214), by the server (152), a sensor reading (216); and transmitting (230) to the system management node (191), by the server (152), the sensor reading (216).

The elements of FIG. 4 that differ from the method of FIG. 2 include: in response to the request (212), retrieving (402), by the server (152), for each sensor having the single virtual sensor number (204), a corresponding sensor reading (450); and transmitting (404), by the server (152), to the system management node (191), the corresponding sensor readings (450).

The method of FIG. 4 includes in response to the request (212), retrieving (402), by the server (152), for each sensor having the single virtual sensor number (204), a corresponding sensor reading (450). Retrieving (402) for each sensor having the single virtual sensor number (204), a corresponding sensor reading (450) may be carried out by retrieving each instance ID associated with the virtual sensor number (204) and querying an entity association record for a corresponding sensor reading based on each retrieved instance ID.

The method of FIG. 4 includes transmitting (404), by the server (152), to the system management node (191), the corresponding sensor readings (450). Transmitting (404) to the system management node (191), the corresponding sensor readings (450) may be carried out by establishing communication between the system management node (191) and the server (152) and transmitting data that indicates the corresponding sensor readings (450).

Figure 5:
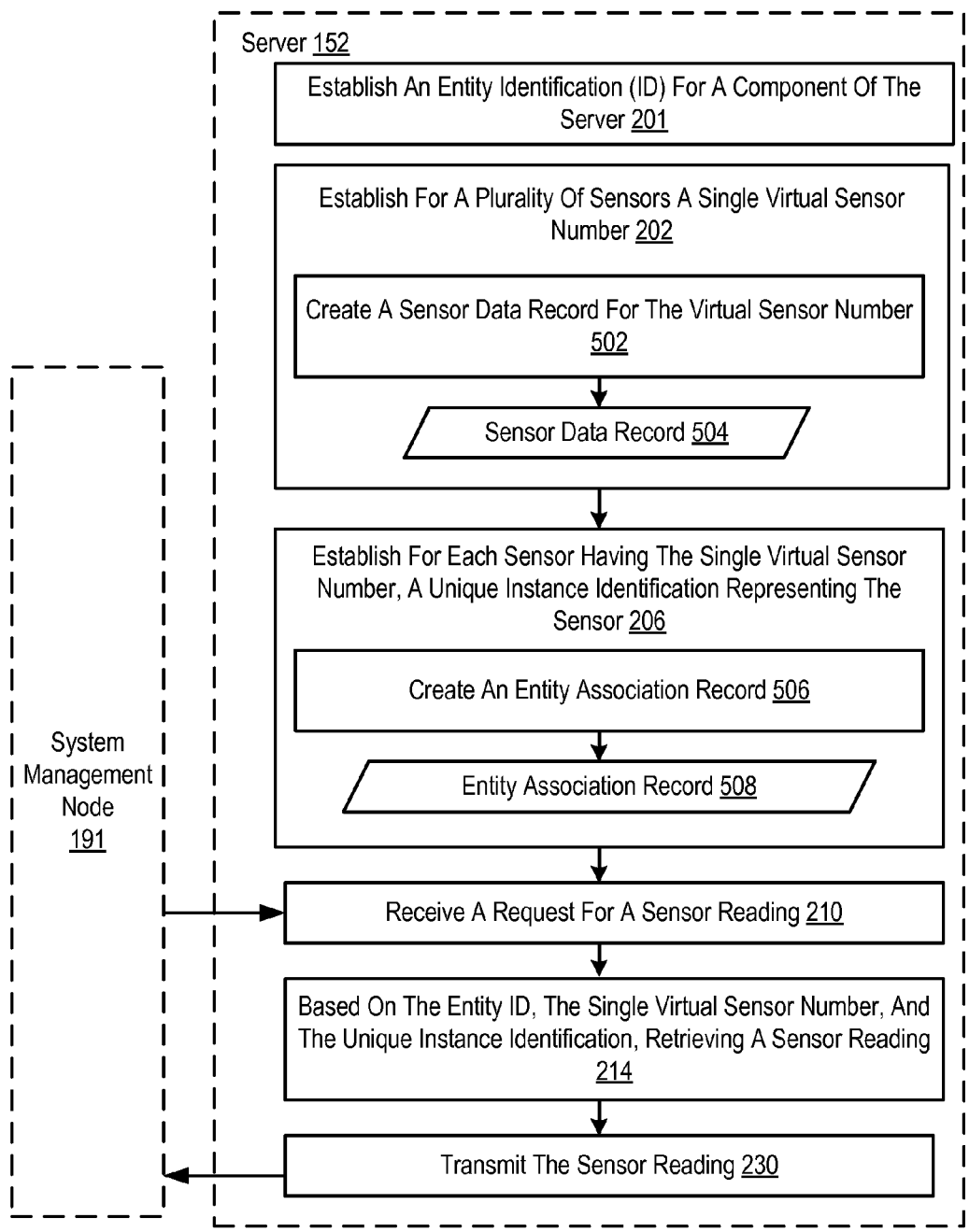
FIG. 5 sets forth a flow chart illustrating another example of a method for monitoring sensors for systems management according to embodiments of the present invention.

For further explanation, FIG. 5 sets forth a flow chart illustrating another example of a method for monitoring sensors for systems management according to embodiments of the present invention. The method of FIG. 5 includes the following elements of the method of FIG. 2: establishing (201), by the server (152), an entity identification (ID) (203) for a component of the server (152); establishing (202), by a server (152), for a plurality (183) of sensors a single virtual sensor number (204); establishing (206), by the server (152), for each sensor (181) having the single virtual sensor number (204) a unique instance identification (208) representing the sensor (181); receiving (210), from the system management node (191), by the server (152), a request (212) for a sensor reading, the request (212) including the entity identification (203), the single virtual sensor number (204), and the unique instance identification (208); based on the entity identification (203), the single virtual sensor number (204), and the unique instance identification (208), retrieving (214), by the server (152), a sensor reading (216); and transmitting (230) to the system management node (191), by the server (152), the sensor reading (216).

The elements of FIG. 5 that differ from the method of FIG. 2 include: creating (502), by the server (152), a sensor data record (504) for the virtual sensor number (204); and creating (506), by the server (152), an entity association record (508).

In the method of FIG. 5, establishing (202), by a server (152), for a plurality (183) of sensors a single virtual sensor number (204) includes creating (502), by the server (152), a sensor data record (504) for the virtual sensor number (204). Creating (502) the sensor data record (504) may be carried out by associating a virtual sensor number with each sensor in the sensor data record (504) and storing the sensor data record (504) in the server (152).

In the method of FIG. 5, establishing (206), by the server (152), for each sensor (181) having the single virtual sensor number (204) a unique instance identification (208) representing the sensor (181) includes creating (506), by the server (152), an entity association record (508). Creating (506) the entity association record (508) may be carried out by associating a sensor with the unique instance identification (208) and storing the unique instance identification in the entity association record (508) in the server (152).

Example embodiments of the present invention are described largely in the context of a fully functional computer system for monitoring sensors for systems management. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of monitoring sensors for systems management, the method comprising:
    establishing, by a server, an entity identification for a component of the server, the entity identification comprising an identifier of a component of the server that is monitored by one or more of a plurality of sensors;
    establishing, by the server, for the plurality of sensors a single virtual sensor number;
    establishing, by the server, for each sensor having the single virtual sensor number a unique instance identification representing the sensor;
    receiving, from a system management node, by the server, a request for a sensor reading, the request including the entity identification, the single virtual sensor number, and the unique instance identification;
    based on the entity identification, the single virtual sensor number, and the unique instance identification, retrieving, by the server, a sensor reading; and
    transmitting to the system management node, by the server, the sensor reading.

2. The method of claim 1, wherein establishing for a plurality of sensors a single virtual sensor number further comprises creating, by the server, a sensor data record for the virtual sensor number.

3. The method of claim 2, wherein the sensor reading is retrieved based on the sensor data record.

4. The method of claim 1, wherein establishing for each sensor having the single virtual sensor number, a unique instance identification representing the sensor further comprises creating, by the server, an entity association record.

5. The method of claim 4, wherein the sensor reading is retrieved based on the entity association record.

6. The method of claim 1, further comprising:
    in response to the request, retrieving, by the server, for each sensor having the single virtual sensor number, a corresponding sensor reading; and
    transmitting, by the server, to the system management node, the corresponding sensor readings.

7. The method of claim 1 further comprising:
    determining, by the server, whether the sensor reading is within predetermined tolerances; and
    if the sensor reading is not within the predetermined tolerances notifying, by the server, a system management node for the server.

* * * * *